G. LEACH.
Rotary Fan.
No. 47,838.
Patented May 23, 1865.
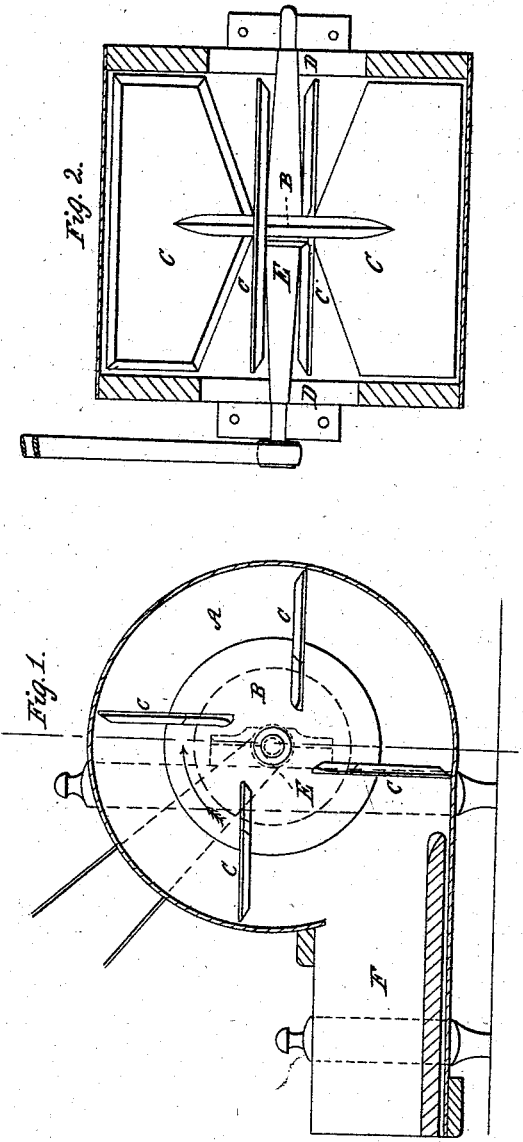
Witnesses:
Edward H. Knight
Inventor:
George Leach

UNITED STATES PATENT OFFICE.

GEORGE LEACH, OF ELMIRA, NEW YORK.

IMPROVEMENT IN ROTARY FANS.

Specification forming part of Letters Patent No. 47,838, dated May 23, 1865.

*To all whom it may concern:*

Be it known that I, GEORGE LEACH, of Elmira, in the county of Chemung and State of New York, have made certain new and useful Improvements in Blowers; and I do hereby declare the following to be a full, clear, and exact description of the nature, construction, and operation of the same, reference being had to the accompanying drawings, which are made part of this specification, and in which—

Figure 1 represents a side elevation, the side portion of the casing being removed to expose the revolving fan to view. Fig. 2 is a section on the line $x\,x$, Fig. 1, the fan being shown in elevation.

Similar letters refer to like parts in the two figures.

The object of my invention is to obtain a more effective draft, and the means employed for that object principally relate to the shape and position of the wings, and to their mode of attachment, by which free course is given to the incoming air, and the chute leading from the fan-case is traversed by an even column of air.

To enable one skilled in the art to make and use my improvement, I will proceed to describe it.

A is the casing, in which is a revolving fan, consisting of a solid disk, B, with a sharpened periphery and wings C of the form shown in Fig. 2—that is, tapering toward the ends which are presented to the openings D in the fan-case, through which the air enters. The wings are attached to the disk in a position tangential to the shaft E of the disk, and not radial therewith, which position conduces to their effectiveness. The wings being connected by the central disk to the shafts, the counter-currents of air which are induced by the usual radial arms are avoided, and the air is permitted to enter freely around the shaft E, and by means of the sharp edge of the disk is caused to pass off without forming an eddy in the fan-case.

The wings are attached to the disk in the position indicated, and by any suitable means, and owing to their shape make an even blast of air along the spout F, which is deflected at pleasure by means of the valve-board G. The same effect cannot be produced by the usual radial wings of rectangular shape, as experiment demonstrates. The wider the central portion, compared with the ends, the more determination is there of air along the center of the chute, and the point of equable action is attained by the proper proportioning of the shape of the wings. This point is highly desirable in many cases where the blast is used as an adjunct in the separator of seeds.

When radial wings of the usual oblong or rectangular form are used, it will be found that the incoming air is immediately deflected, so as to be centrifugally driven along the spout, and the blast is much the strongest along the sides of the spout as the air which enters is immediately driven off by the wings, and it fails to reach the central portion of the latter, so that there is a comparatively weak current of air in the center of the chute, and at high speed a counter-current.

By the form of the wings in my blower the air is enabled to reach all portions, and is conveyed in an even column to its destination.

When the wings are attached radially to the shaft, the air upon which they impinge is not driven so directly in a centrifugal direction as by placing them in the tangential position described and represented. In the latter case it is passed more directly outward, and the tendency to be carried around in the fan-case is lessened.

The even blast is a matter of great importance in obtaining results of an equitable quality—as, for instance, in cleaning grain for seed when it is desired to have a berry of uniform size and consequent development, so as to obtain an uniform plant which will ripen evenly. This is merely given as one illustration of the benefit of a blast of air of even power at all points in the chute which delivers the blast. The device is one of construction, and is not limited by its application.

The shape of the fan must bear a certain relation to the width of the case, as when a wider fan-case is used the narrower will be the ends of the wings comparatively with their mid-width, because as the air has further to go—from the sides of the fan-case to reach the center of the fan—the more it is exposed to be deflected before reaching that point and leaving the latter without a sufficient supply of air from the sides of the fan-case.

Having thus described my invention, what

I claim therein as new, and desire to secure by Letters Patent, is—

1. The combination of the fan-shaft and the disk with wings attached thereto.

2. The described taper form of wings, in combination with the disk, substantially as described.

The above specification of my improvement in rotary fans signed this 9th day of March, 1865.

GEORGE LEACH.

Witnesses:
ALEXR. A. C. KLAUCKE,
C. D. SMITH.